United States Patent
Speicher et al.

(10) Patent No.: US 11,388,769 B2
(45) Date of Patent: Jul. 12, 2022

(54) TECHNIQUES FOR COMMUNICATING MANAGEMENT INFORMATION FOR MECHANISMS USING WIRELESS COMMUNICATIONS

(71) Applicant: QUALCOMM Incorporated, San Diego, CA (US)

(72) Inventors: Sebastian Speicher, Wallisellen (CH); Haris Zisimopoulos, London (GB); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/903,268

(22) Filed: Jun. 16, 2020

(65) Prior Publication Data

US 2020/0404731 A1    Dec. 24, 2020

(30) Foreign Application Priority Data

Jun. 18, 2019  (GR) ............................. 20190100267

(51) Int. Cl.
*H04W 72/04* (2009.01)
*H04W 74/00* (2009.01)
(Continued)

(52) U.S. Cl.
CPC ............ *H04W 76/20* (2018.02); *H04W 76/11* (2018.02); *H04W 88/04* (2013.01)

(58) Field of Classification Search
CPC ..... H04W 76/20; H04W 76/11; H04W 88/04; H04W 48/18; H04W 24/02; H04W 88/14;
(Continued)

(56) References Cited

U.S. PATENT DOCUMENTS

| | | | |
|---|---|---|---|
| 8,600,424 B2 * | 12/2013 | Chen ................... | H04W 52/244 455/522 |
| 2010/0056197 A1 * | 3/2010 | Attar ................... | H04W 52/241 455/522 |

(Continued)

OTHER PUBLICATIONS

"3rd Generation Partnership Project; Technical Specification Group Services and System Aspects; Study on enhancement of 5G System (5GS) for vertical and Local Area Network (LAN) services (Release 16)", 3GPP Standard Technical Report; 3GPP TR 23.734, 3RD Generation Partnership Project (3GPP), Mobile Competence Centre, 650, Route Des Lucioles, F-06921, Sophia-Antipolis Cedex, France, No. V16.2.0, Jun. 11, 2019 (Jun. 11, 2019), pp. 1-117, XP051753966, [retrieved on Jun. 11, 2019] p. 42 pp. 83-84.

(Continued)

*Primary Examiner* — Andrew Wendell
(74) *Attorney, Agent, or Firm* — Arent Fox, LLP

(57) ABSTRACT

Aspects described herein relate to enabling data network devices to communicate using wireless network nodes, including user equipment (UE) and/or core network nodes, in a wireless network. The data network devices can have associated mechanisms for interfacing with the wireless network nodes, and the wireless network functions can facilitate transparent transfer of control information for the associated mechanisms.

48 Claims, 9 Drawing Sheets

(51) Int. Cl.
*H04W 76/20* (2018.01)
*H04W 76/11* (2018.01)
*H04W 88/04* (2009.01)

(58) Field of Classification Search
CPC ............. H04W 84/18; H04W 72/0406; H04W 72/1278; H04W 74/002
See application file for complete search history.

(56) References Cited

U.S. PATENT DOCUMENTS

| | | | | |
|---|---|---|---|---|
| 2011/0038431 | A1* | 2/2011 | Frederiksen | H04W 24/02 375/259 |
| 2015/0381475 | A1* | 12/2015 | Yamamoto | H04W 24/08 370/216 |
| 2017/0105206 | A1* | 4/2017 | Maattanen | H04L 5/0091 |
| 2017/0149967 | A1* | 5/2017 | Chandrasekaran | H04M 3/42374 |
| 2017/0150390 | A1* | 5/2017 | Ahmad | H04L 47/2475 |
| 2018/0092027 | A1* | 3/2018 | Sheng | H04W 48/12 |
| 2019/0098528 | A1* | 3/2019 | Chong | H04W 28/0215 |
| 2019/0245948 | A1* | 8/2019 | Li | H04L 69/326 |
| 2020/0084613 | A1* | 3/2020 | Ying | H04W 8/08 |
| 2020/0187043 | A1* | 6/2020 | Xin | H04M 15/66 |

OTHER PUBLICATIONS

CATT "5GS and TSN Integration", 3GPP Draft, 3GPP TSG-RAN WG2 Meeting #104, R2-1816363 5GS and TSN Integration—Final, 3RD Generation Partnership Project (3GPP), Mobile Competence Centre, 650, Route Des Lucioles, F-06921, Sophia-Antipolis Cedex, France, vol. RAN WG2, No. Spokane, USA; Nov. 12-16, 2018, Nov. 2, 2018 (Nov. 2, 2018), XP051480326, 5 pages, Retrieved from the Internet: URL: http://www.3gpp.org/ftp/tsg%5Fran/WG2%5FRL2/TSGR2%5F104/Docs/R2%2D1816363%2Ezip [retrieved on Nov. 2, 2018] the whole document.

Huawei., et al., "Updates on solution #18", 3GPP Draft, 3GPP TSG-SA WG2 Meeting #129Bis, S2-1812232 TR23734 PCR Solution #18 Updating for 5GS Bridge Sets up and QOS Profile Generation, 3RD Generation Partnership Project (3GPP), Mobile Competence Centre, 650, Route Des Lucioles, F-06921, Sophia-Antipolis Cedex, France, vol. SA WG2, No. West Palm Beach, USA, Nov. 26-30, 2018, Nov. 20, 2018 (Nov. 20, 2018), XP051490408, 8 pages, Retrieved from the Internet: URL: http://www.3gpp.org/ftp/tsg%5Fsa/WG2%, the whole document.

Partial International Search Report—PCT/US2020/038226—ISA/EPO—dated Sep. 15, 2020.

Qualcomm Incorporated: "Transport of Management Information in 5GS", 3GPP Draft, SA WG2 Meeting #133, S2-1905221 DP Bridge Mgmt V1, 3RD Generation Partnership Project (3GPP), Mobile Competence Centre, 650, Route Des Lucioles, F-06921, Sophia-Antipolis Cedex, France, vol. SA WG2, No. Reno, NV, USA; May 13-17, 2019, May 7, 2019 (May 7, 2019), XP051735445, 2 pages, Retrieved from the Internet: URL: http://www.3gpp.org/ftp/Meetings%5F3GPP%5FSYNC/SA2/Docs/S2%2D1905221%2Ezip [retrieved on May 7, 2019.] the whole document.

Samsung: "5GLAN Solution #13 update", 3GPP Draft, 3GPP TSG SA WG2 Meeting #129Bis, S2-1811780 23734 5GLAN Solution #13 Update, 3RD Generation Partnership Project (3GPP), Mobile Competence Centre, 650, Route Des Lucioles, F-06921, Sophia-Antipolis Cedex, France, vol. SA WG2. No. West Palm Beach, Florida. USA; Nov. 26-30, 2018, Nov. 20, 2018 (Nov. 20, 2018), XP051563320, 4 pages, Retrieved from the Internet: URL:http://www.3gpp.org/ftp/Meetings%5F3GPP%5FSYNC/SA2/Docs/S2%2D1811780%2Ezip [retrieved on Nov. 20, 2018-11-20], the whole document.

3GPP TS 23.501: "3rd Generation Partnership Project, Technical Specification Group Services and System Aspects, System Architecture for the 5G System, Stage 2 (Release 16)", 3GPP Standard, Technical Specification, France, vol. SA WG2, No. V16.1.0, Jun. 11, 2019 (Jun. 11, 2019), pp. 1-368, XP051753956, p. 117-p. 119, p. 139, p. 144-p. 145, p. 202-p. 204.

International Search Report and Written Opinion—PCT/US2020/038226—ISA/EPO—dated Dec. 9, 2020.

* cited by examiner

TECHNIQUES FOR COMMUNICATING MANAGEMENT INFORMATION FOR MECHANISMS USING WIRELESS COMMUNICATIONS

CLAIM OF PRIORITY UNDER 35 U.S.C. § 119

The present Application for Patent claims priority to Greek Patent Application No. 20190100267, entitled "TECHNIQUES FOR COMMUNICATING MANAGEMENT INFORMATION FOR MECHANISMS USING WIRELESS COMMUNICATIONS" filed Jun. 18, 2019, which is assigned to the assignee hereof and hereby expressly incorporated by reference herein for all purposes.

BACKGROUND

Aspects of the present disclosure relate generally to wireless communication systems, and more particularly, to using wireless communication systems for communication between other mechanisms.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of reporting control information via wireless communication is provided. The method includes obtaining, by a user equipment (UE), at least one of control information or status information for at least one of a mechanism used to attach an end node to the UE or the end node, and transmitting, via a radio access network, at least one of the control information or the status information to a network function in a wireless network for providing to an application that manages at least one of the mechanism or the end node.

In another aspect, a method for reporting control information via wireless communication is provided. The method includes obtaining, by a first network function, at least one of control information or status information for a mechanism on the first network function used to communicate with an end node attached to the UE, and transmitting, via one or more core network nodes of a wireless network, at least one of the control information or the status information to a second network function for providing to an application that manages the mechanism.

In another aspect, a method for reporting control information via wireless communication. The method includes receiving, by a first network function and from an application via a data network, a communication for providing to a mechanism that attaches data network nodes to a wireless network via one or more UEs or one or more core network nodes, determining a mechanism to which the communication relates, where the communication relates to at least one of a first mechanism used to attach an end node to a UE or the end node, transmitting the communication to the first mechanism via a radio access network and the UE, and where the communication relates to a second mechanism used to attach a second network function to the data network, sending the communication to the second mechanism via one or more core network nodes of the wireless network.

In another aspect, an apparatus for wireless communication is provided that includes a transceiver, a memory configured to store instructions, and one or more processors communicatively coupled with the transceiver and the memory. The one or more processors are configured to obtain at least one of control information or status information for at least one of a mechanism used to attach an end node to the apparatus or the end node, and transmit, via a radio access network, at least one of the control information or the status information to a network function in a wireless network for providing to an application that manages at least one of the mechanism or the end node.

In another aspect, An apparatus for wireless communication is provided that includes a transceiver, a memory configured to store instructions, and one or more processors communicatively coupled with the transceiver and the memory. The one or more processors are configured to obtain, by a first network function, at least one of control information or status information for a mechanism on the first network function used to communicate with an end node, and transmit, via one or more core network nodes of a wireless network, at least one of the control information or the status information to a second network function for providing to an application that manages the mechanism.

In another aspect, an apparatus for wireless communication is provided that includes a transceiver, a memory configured to store instructions, and one or more processors communicatively coupled with the transceiver and the memory. The one or more processors are configured to receive, by a first network function and from an application via a data network, a communication for providing to a mechanism that attaches data network nodes to a wireless network via one or more UEs or one or more core network nodes, determine a mechanism to which the communication relates, where the communication relates to at least one of a first mechanism used to attach an end node to a user equipment (UE) or the end node, transmit the communication to the first mechanism via a radio access network and the UE, and where the communication relates to a second mechanism used to attach a second network function to the data network, send the communication to the second mechanism via one or more core network nodes of the wireless network.

In another aspect, an apparatus for reporting control information via wireless communication is provided that includes means for obtaining at least one of control information or status information for at least one of a mechanism used to attach an end node to the apparatus or the end node, and means for transmitting, via a radio access network, at least one of the control information or the status information to a network function in a wireless network for providing to an application that manages at least one of the mechanism or the end node.

In another aspect, an apparatus for reporting control information via wireless communication is provided that includes means for obtaining, by a first network function, at least one of control information or status information for a mechanism on the first network function used to communicate with an end node, and means for transmitting, via a one or more core network nodes of a wireless network, at least one of the control information or the status information to a second network function for providing to an application that manages the mechanism.

In another aspect, an apparatus for reporting control information via wireless communication is provided that includes means for receiving, by a first network function and from an application via a data network, a communication for providing to a mechanism that attaches data network nodes to a wireless network via one or more UEs or one or more core network nodes, means for determining a mechanism to which the communication relates, means for, where the communication relates to at least one of a first mechanism used to attach an end node to a user equipment (UE) or the end node, transmitting the communication to the first mechanism via a radio access network and the UE, and means for, where the communication relates to a second mechanism used to attach a second network function to the data network, sending the communication to the second mechanism via one or more core network nodes of the wireless network.

In another aspect, a computer-readable medium including code executable by one or more processors for reporting control information via wireless communications is provided. The code includes code for obtaining, by a user equipment (UE), at least one of control information or status information for at least one of a mechanism used to attach an end node to the UE or the end node, and transmitting, via a radio access network, at least one of the control information or the status information to a network function in a wireless network for providing to an application that manages at least one of the mechanism or the end node.

In another aspect, a computer-readable medium including code executable by one or more processors for reporting control information via wireless communications is provided. The code includes code for obtaining, by a first network function, at least one of control information or status information for a mechanism on the first network function used to communicate with an end node, and transmitting, via one or more core network nodes of a wireless network, at least one of the control information or the status information to a second network function for providing to an application that manages the mechanism.

In another aspect, a computer-readable medium including code executable by one or more processors for reporting control information via wireless communications is provided. The code includes code for receiving, by a first network function and from an application via a data network, a communication for providing to a mechanism that attaches data network nodes to a wireless network via one or more UEs or one or more core network nodes, determining a mechanism to which the communication relates, where the communication relates to at least one of a first mechanism used to attach an end node to a user equipment (UE) or the end node, transmitting the communication to the first mechanism via a radio access network and the UE, and where the communication relates to a second mechanism used to attach a second network function to the data network, sending the communication to the second mechanism via one or more core network nodes of the wireless network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
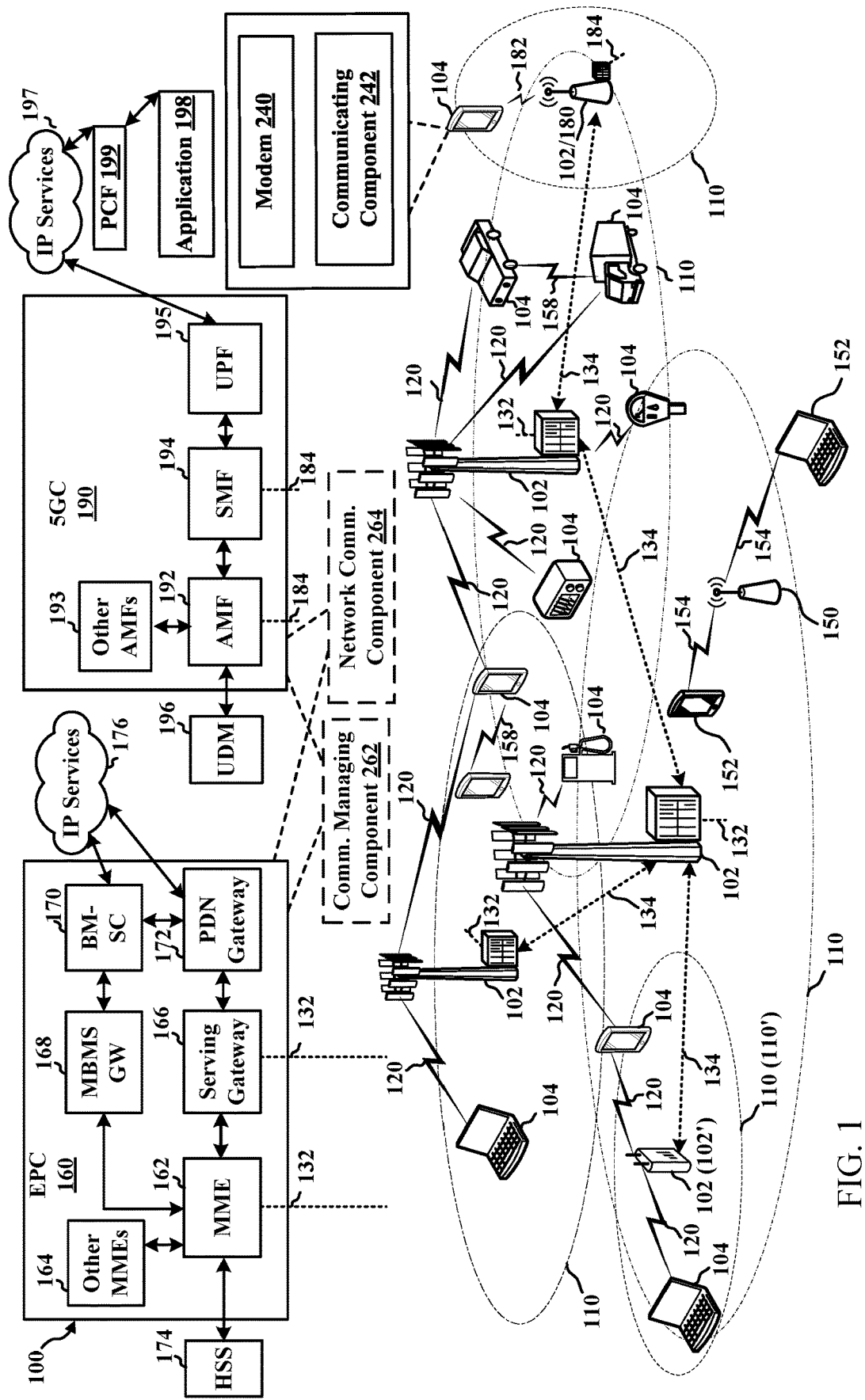
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing transparent transfer of control information for nodes of a data network using nodes of a wireless network. For example, the nodes of the data network can communicate with one another by using nodes of a wireless network, such as a user equipment (UE) or other nodes that may support communications via a radio access technology (RAT), such as fifth generation (5G) new radio (NR), long term evolution (LTE), etc. For example, the nodes of the wireless network may have a mechanism to attach to an end node of the data network. In addition, for example, a network function of the wireless network (e.g., a user plane function (UPF)) having a mechanism to attach to the data network. For example, the end node may include substantially any node that can connect to a UE to utilize the wireless communication (e.g., modem) capabilities thereof, such as a computer or computing device, a peripheral, an Internet-of-Things device, an industrial automation device, a drone, etc. For example, the end node may include nodes that can, in this or other examples, include a wired or wireless local area network (LAN) interface to communicate in a wired or wireless network. In addition, the mechanism to attach to the end node can include substantially any communications interface that can be managed, such as a physical port (e.g., Ethernet port, universal serial bus (USB) or other communication bus port, a wireless interface such as a Bluetooth transceiver, and/or the like).

Management information for the mechanism(s), and/or for the end nodes themselves, can be communicated with an application via the data network by leveraging the wireless network for communicating with the mechanisms, end nodes, or related management entities (e.g., using the corresponding RAT). In this regard, management information for the mechanisms and/or end nodes can be communicated to/from a UE using a radio access network portion of the wireless network and/or can be communicated to/from a network function of the wireless network using one or more other core network nodes or functions of the wireless network.

In the context of vertical local area network (LAN) and/or Industrial Internet of Things (IIoT), for example, Time Sensitive Networking (TSN) for Ethernet traffic can be supported by using fifth generation (5G) systems (5GS). To support TSN in 5GS, Ethernet port management information can be communicated between an application function and the Ethernet ports, where the Ethernet ports can be co-located, or otherwise coupled (e.g., electrically coupled) with the UE and a UPF. For example, the Ethernet ports can be the mechanisms described herein for which the management information can be communicated via the wireless network. One example of port management information can include gate control information that the TSN Application Function provides to the Ethernet port co-located or coupled with the UE and UPF (e.g., the Ethernet port that facilitate communication between a network device and its UE or UPF). Gate control information can enable the Ethernet chip to support the TSN scheduling algorithm. The 5GS can be agnostic to the contents of the port management information and can simply convey the information between an application function and the UE or UPF, in one example.

In addition, though only a minimum set of port management information may be supported in the 5GS, some industrial automation scenarios may use support of additional Ethernet port management, or end node management, information or may potentially also exchange of proprietary port/end node management information. Also, TSN standards may evolve so that additional port management information is used. Given this and given that the port/end node management information can be agnostic for 5GS, aspects described herein allow wireless network protocols (e.g., of a RAT), such as non-access stratum (NAS), to not require modification, retesting, etc. each time additional Ethernet port management information and/or end node management information is introduced and supported. In particular, aspects described herein relate to transparent transfer of Ethernet port management information (or more generally, mechanism management information) and/or end node management information via 5GS or other system that uses a RAT for wireless communication. This can allow for future extensibility (e.g. additional mechanism/end node management information to be sent to mechanisms—e.g., Ethernet ports—co-located with UE or UPF) without having to update the UE NAS stack and core network protocols each time new management information needs to be exchanged.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for obtaining and/or communicating control information for a mechanism that attaches an end node, such as an Ethernet port, via the wireless network. In addition, some nodes and/or network functions may include a network communicating component 264 for obtaining and/or communicating control information for a mechanism that attaches the nodes and/or network functions to a data network, such as an Ethernet port, via the wireless network. In addition, some nodes and/or network functions may include a communicating managing component 262 for communicating, over a data network, the control information from the various mechanisms to and/or from an application 198 that manages the mechanisms (e.g., via IP services 197). Though a UE 104 is shown as having the modem 240 and communicating component 242, this is one illustrative example, and substantially any node or type of node may include a modem 240 and communicating component 242 for providing corresponding functionalities described herein. Moreover, though described in terms of 5G throughout, the functions and concepts described herein may be applied to 3GPP and/or corresponding EPC 160 as well, where one or more network components or functions of the EPC 160 can include communication managing component 262 and/or network communicating component 264 and/or can communicate with application 198 (e.g., via IP services 176).

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, as described further herein, a UE 104 can attach to an end node and UPF 195 can attach to a data network, and the 5G wireless network (e.g., wireless access network 100) can be used to provide communications between the end node and the data network without requiring a physical connection. In this regard, for example, the UE 104 can attach to the end node using a mechanism the end node would otherwise use to attach to the data network (e.g., an Ethernet port), and the UPF 195 can also attach to the data network using a similar mechanism (e.g., an Ethernet port). The UE 104 can communicate, via communicating component 242, control information for the mechanism that attaches the end node in a data network. In another example, a UPF 195 or other component or function with the similar mechanism for attaching to the data network, can communicate, via network communicating component 264, control information for the mechanism that attaches the UPF 195 to the data network. In addition, a SMF 194 or other node can include a communication managing component 262 that can manage sending of this control information to/from application 198 that manages the mechanisms. In an example, SMF 194 can send the control information to and/or receive the control information from the applications 198 via a policy control function (PCF) 199 deployed therebetween. Using the SMF 194 to manage sending of the control information for the mechanisms can provide a transparent transfer for the control information to allow the wireless network to remain agnostic about the contents of the control information that relates to the mechanisms.

Turning now to FIGS. 2-9, aspects are depicted with reference to one or more components and one or more methods that may perform the actions or operations described herein, where aspects in dashed line may be optional. Although the operations described below in FIGS. 3-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
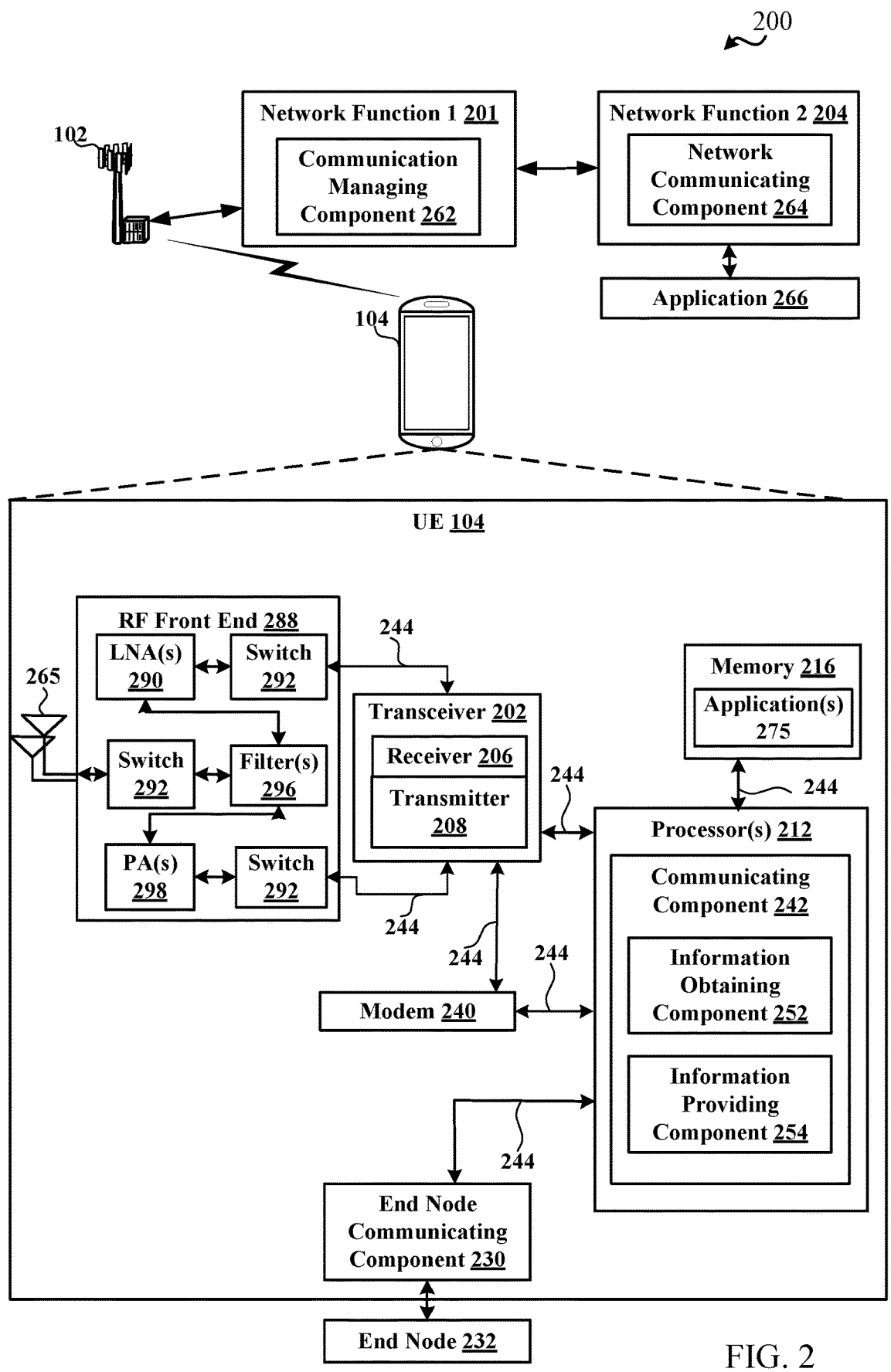
FIG. 2 is a block diagram illustrating an example of a UE, in accordance with various aspects of the present disclosure.

Referring to FIG. 2, one example of an implementation of a system 200 that includes a base station 102 and a UE 104 that communicates with the base station 102 to access a core wireless network. The first network may include a variety of components or functions (e.g., components or functions of a EPC 160 or 5GC 190, as described), such as network function 1 201 and network function 2 204. Network function 1 201 can include a AMF 192, 193 and/or SMF 194 in a 5GC 190, a MME 162 or PDN gateway 172 in a EPC 160, etc., and network function 2 204 can include a UPF 195 in a 5GC 190 or a PDN gateway 172 in an EPC 160. In any case, UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing one or more functions associated with communicating control information for a mechanism that attaches to an end node, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

UE 104 can also include an end node communicating component 230 for attaching to and/or communicating with an end node 232. End node communicating component 230 can include a mechanism for communicating with the end node 232, which as described may include a physical interface, such as an Ethernet port or other port, a management entity for the interface, and/or the like. Communicating component 242 may include an information obtaining component 252 for obtaining the control information from the end node communicating component 230 and transmitting the control information to one or more wireless network nodes via a RAN, which may include base station 102. Communicating component 242 may also include an information providing component 254 for communicating control information (e.g., received via the RAN) to end node communicating component 230. For example, the control information may include management information (e.g., for an Ethernet port).

In addition, for example, base station 102 may be coupled with one or more network functions, such as network function 1 201 and/or network function 2 204, via one or more core network nodes. In an example, network function 2 204 may include a UPF and/or may have a network communicating component 264 for communicating in a data network with an application 266, which may be similar to application 198. Network communicating component 264 may include a mechanism for communicating in the data network (e.g., along with communicating with one or more nodes in the 5GC), which may include an interface such as an Ethernet port and/or a corresponding management entity. Network function 1 201 may include a SMF and/or may have a communication managing component 262 for managing control information communications from the UE 104 for its end node communicating component 230 and/or from the network function 2 204 for its network communicating component 264, as described further herein.

In an aspect, the processor(s) 212 may correspond to one or more of the processors described in connection with the UE in FIG. 9. Similarly, the memory 216 may correspond to the memory described in connection with the UE in FIG. 9. In addition, network function 1 201 and/or network function 2 204 may include or be associated with devices that have processor(s) and/or memory(ies) similar to those described in connection with UE 104 to provide functionality of the described components 262, 264, but the additional processor, memory and/or other components associated with the functions 201, 204 are omitted in this Figure for ease of explanation.

Figure 3:
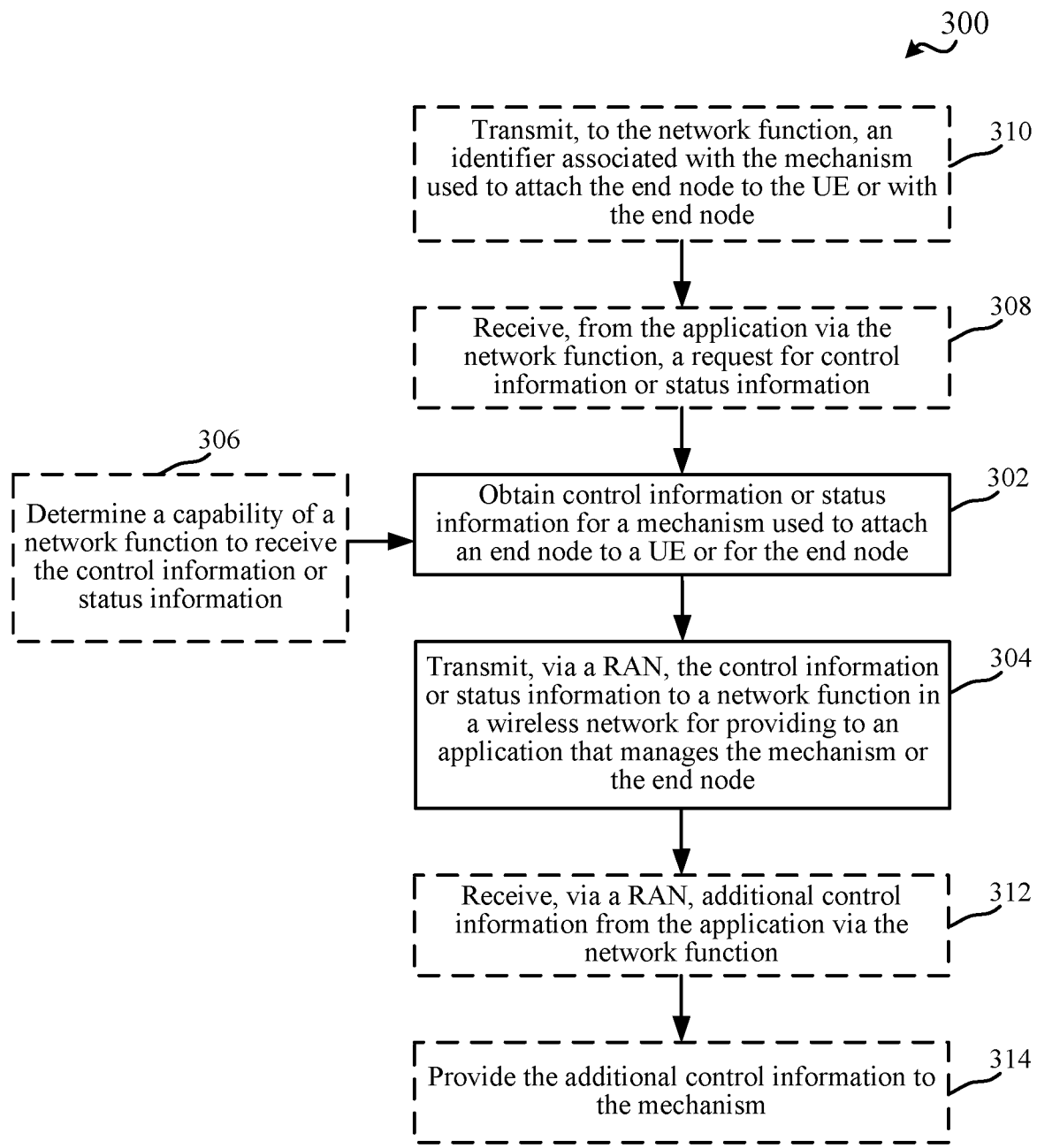
FIG. 3 is a flow chart illustrating an example of a method for sending control information for a mechanism that attaches an end node, in accordance with various aspects of the present disclosure.

FIG. 3 illustrates a flow chart of an example of a method 300 for communicating control information for a mechanism that attaches a UE to an end node in accordance with aspects described herein. In one example, a UE 104 can perform the functions described in method 300 using one or more of the components described in FIGS. 1 and 2.

In method 300, at Block 302, control information or status information for a mechanism used to attach an end node to a UE or for the end node itself can be obtained. In an aspect, information obtaining component 252, e.g., in conjunction with processor(s) 212, memory 216, transceiver 202, communicating component 242, etc., can obtain control information or status information for the mechanism used to attach the end node to the UE (e.g., UE 104) or for the end node itself. The control information and/or status information may be collectively referred to herein as "information." Control information can include parameters to control the behavior of the mechanism or end node, and status information can include information relating to a state, e.g. control information previously sent to the end node, statistics, measurements, health information, etc. of the mechanism, end node, or one or more related components or functions. For example, the mechanism may include a mechanism provided in end node communicating component 230 to communicate with end node 232. In one example, as described, the mechanism can include an Ethernet port, and the control information may include management information for the Ethernet port, such as gate control information enabling an Ethernet chip to support TSN scheduling, propagation delay parameters, tick granularity, traffic class tables, and/or other management information, management capabilities, information indicating information supported by the mechanism or end node, etc.

In an example, management information may be such as defined in a standard, such as IEEE 802.11qcc, IEEE 802.1Q, IEEE 802.1AB, etc. In another example, management information may include information defined by an application 266, which may be proprietary to the application, a context or network in which the end node 232 is implemented, and/or the like. In an example, information obtaining component 252 may receive the control information from the end node via end node communicating component 230, where the control information may be received in response to a request from the information obtaining component 252 or otherwise. In addition, the obtained control information may be associated with an identifier of the mechanism, such as a MAC address of an Ethernet port, etc., and/or with an identifier associated with the data network, such as a protocol data unit (PDU) session identifier.

In method 300, at Block 304, the control information or status information can be transmitted, via a RAN, to a network function in a wireless network for providing to an application that manages the mechanism or the end node. In an aspect, information obtaining component 252, e.g., in conjunction with processor(s) 212, memory 216, transceiver 202, communicating component 242, etc., can transmit, via the RAN, the control information or the status information to the network function in a wireless network for providing to the application that manages the mechanism or the end node. For example, information obtaining component 252 can transmit the control information to base station 102 for providing to one or more of the network functions (e.g., network function 1 201 or network function 2 204) for providing to application 266. For example, network function 1 201, which can be a SMF, can function to communicate the control information to application 266 over a data network. In addition, in an example, information obtaining component 252 may include, in the control information or a related container, an identifier of the mechanism (e.g., a MAC address of the Ethernet port, or other identifier), data network parameters (e.g., PDU session identifier), and/or the like. In another example, the control information may include the identifier itself (e.g., the MAC address, or other identifier) such to report the identifier for subsequent control information reporting purposes, as described below in reference to Block 310. Moreover, the control information and/or status information may include a request to provide the control information and/or status information to the application 266 (e.g., to update the control/status or corresponding management information). In another example, information obtaining component 252 can obtain or transmit the information based on a request received for the information, as described further herein.

In method 300, optionally at Block 306, a capability of a network function to receive the control information or status information can be determined. In an aspect, information obtaining component 252, e.g., in conjunction with processor(s) 212, memory 216, transceiver 202, communicating component 242, etc., can determine the capability of the network function to receive the control information or status information. For example, the network function may indicate the capability in signaling to the UE 104, which may include signaling of Core Network SM Capabilities (e.g., received from an SMF via the RAN and/or in signaling from a base station 102) or based on an indication sent in a Protocol Configuration Options (PCO).

In method 300, optionally at Block 308, a request for control information or status information can be received from the application via the network function. In an aspect, information obtaining component 252, e.g., in conjunction with processor(s) 212, memory 216, transceiver 202, communicating component 242, etc., can receive, from the application via the network function, the request for control information or status information. For example, information obtaining component 252 can receive the request over the RAN, and can obtain the control and/or status information, as described in Block 302, based on the request. In one example, the request may also indicate the capability of the network function to receive the control information or status information. Moreover, in an example, the request can be provided to the mechanism or end node, which can handle the request and determine information to transmit in response to the request. In some examples, the request may be a subscription request to subscribe to receive information of the mechanism or end node based on a periodic interval, occurrence of certain events, etc., and information obtaining component 252 can transmit the control information or status information based on the subscription.

In method 300, optionally at Block 310, an identifier associated with the mechanism used to attach the end node to the UE or with the end node can be transmitted to the network function. In an aspect, information providing component 254, e.g., in conjunction with processor(s) 212, memory 216, transceiver 202, communicating component 242, etc., can transmit, to the network function, the identifier associated with the mechanism used to attach the end node to the UE or with the end node itself. As described, the identifier can be a MAC address, or other identifier transmitted to the network function 1 201 when the UE 104, mechanism, and/or end node establishes a connection with the network function 1 201 or other functions of the wireless network. In one example, information providing component 254 can transmit the identifier to the network function in indicating a capability to receive or transmit control information or status information for the mechanism or the end node. Accordingly, in an example, receiving the request at Block 308 may be based on the identifier and/or capability transmitted at Block 310 (e.g., the network function can transmit the request based on the identifier and/or capability).

In method 300, optionally at Block 312, additional control information can be received, via the RAN, from the application via the network function. In an aspect, information providing component 254, e.g., in conjunction with processor(s) 212, memory 216, transceiver 202, communicating component 242, etc., can receive, via the RAN, the additional control information from the application via the network function. As described, network function 1 201 can transmit the additional control information to the UE 104 based on an identifier associated therewith (e.g., based on a MAC address, or other identifier of the mechanism, as described further herein).

In method 300, optionally at Block 314, the additional control information can be provided to the mechanism. In an aspect, information providing component 254, e.g., in conjunction with processor(s) 212, memory 216, transceiver 202, communicating component 242, etc., can provide the additional control information to the mechanism. In this example, the mechanism can store the control information, modify a state based on the control information, and/or the like.

Figure 4:
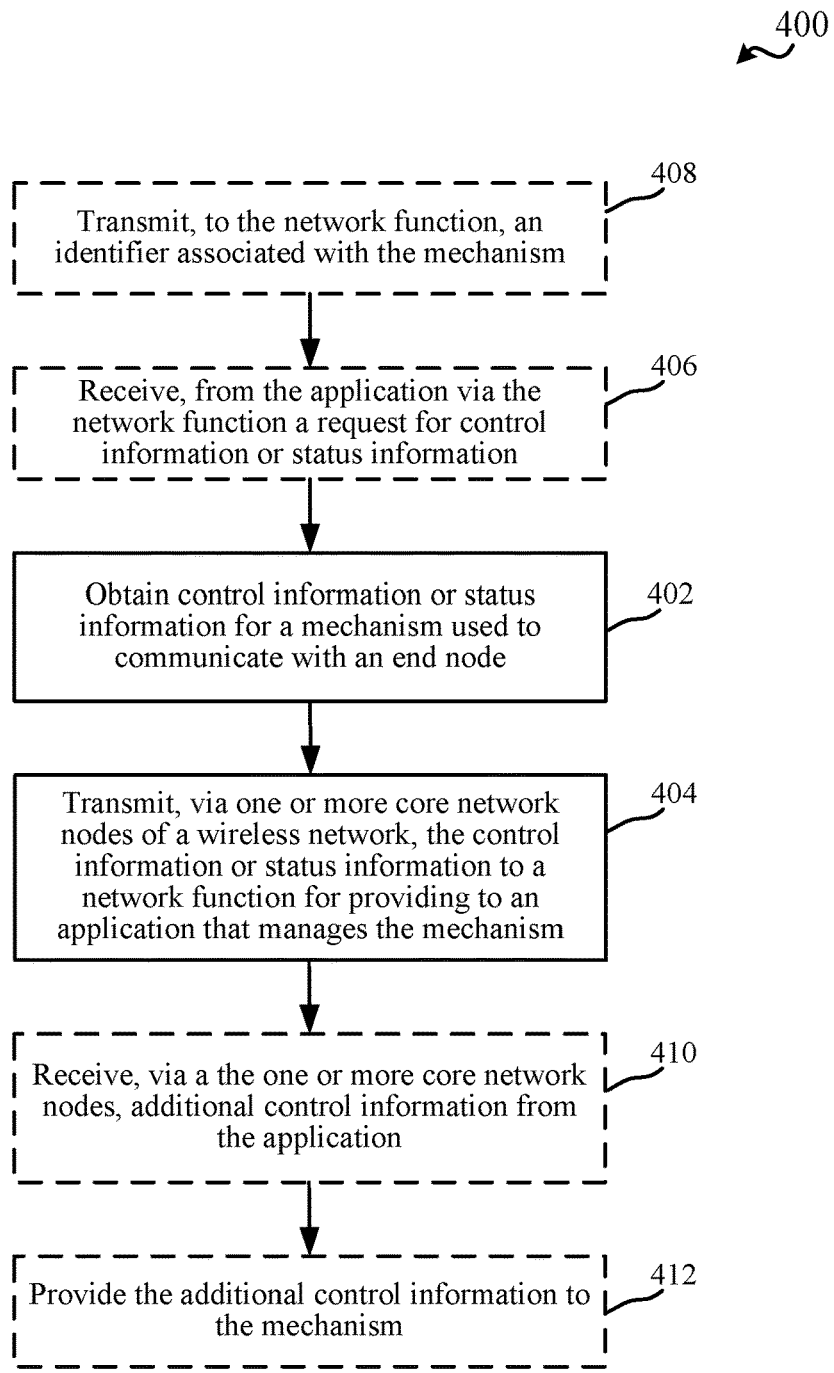
FIG. 4 is a flow chart illustrating an example of a method for sending control information for a mechanism that facilitates communication with a data network, in accordance with various aspects of the present disclosure.

FIG. 4 illustrates a flow chart of an example of a method 400 for communicating control information for a mechanism that attaches a data network node to a wireless network for communicating with an end node attached to a UE in accordance with aspects described herein. In one example, a UPF 195 or other network function can perform the functions described in method 400 using one or more of the components described in FIGS. 1 and 2.

In method 400, at Block 402, control information or status information for a mechanism used to communicate with an end node can be obtained. In an aspect, network communicating component 264, e.g., in conjunction with network function 2 204, can obtain control information or status information for the mechanism used to communicate with the end node. For example, the mechanism may include a mechanism provided in the network communicating component 264 to communicate with end node 232 via a data network. In one example, as described, the mechanism can include an Ethernet port, and the control information may include management information for the Ethernet port, such as gate control information enabling an Ethernet chip to support TSN scheduling, propagation delay parameters, tick granularity, traffic class tables, and/or other management information. Moreover, as described, the mechanism can be attached to the UE (e.g., UE 104) to allow for communication within a RAN. In one example, the management information may include information defined by an application 266, which may be proprietary to the application, a context or network in which the end node 232 is implemented, and/or the like. In an example, network communicating component 264 may receive the control information and/or status information from the mechanism (e.g., the Ethernet port), e.g., where the control information and/or status information may be received in response to a request from the network function 2 204 or otherwise. In addition, the obtained control information and/or status information may be associated with an identifier of the mechanism, such as a MAC address of an Ethernet port, or other identifier, and/or with an identifier associated with the data network, such as a protocol data unit (PDU) session identifier.

In method 400, at Block 404, the control information or status information can be transmitted, via one or more core network nodes of a wireless network, to a network function for providing to an application that manages the mechanism. In an aspect, network communicating component 264, e.g., in conjunction with network function 2 204, can transmit, via the one or more core network nodes of the wireless network, the control information or status information to the network function in for providing to the application that manages the mechanism. For example, network communicating component 264 can transmit the control information or status information to network function 1 201 for providing to application 266 (e.g., via a data network). For example, network function 1 201, which can be a SMF, can function to communicate the control information and/or status information to application 266 over a data network. In addition, in an example, network communicating component 264 may include, in the control information and/or status information or a related container, an identifier of the mechanism (e.g., a MAC address of the Ethernet port, other identifier, etc.), data network parameters (e.g., PDU session identifier), and/or the like. In another example, the control information and/or status information may include the identifier (e.g., MAC address, other identifier, etc.) itself such to report the address for subsequent control information reporting purposes, as described below in reference to Block 408. Moreover, the control information and/or status information may include a request to provide the information to the application 266 (e.g., to update the control/management information). In another example, the control information and/or status information can be obtained and transmitted based on a request for the information. In addition, in an example, the control information and/or status information may be obtained and/or transmitted based on determining Core Network SM Capabilities or based on an indication sent in a Protocol Configuration Options (PCO), which may indicate a capability for obtaining and/or transmitting control information and/or status information for the mechanism and/or end node.

In method 400, optionally at Block 406, a request for control information or status information can be received from the application via the network function. In an aspect, network communicating component 264, e.g., in conjunction with network function 2 204, can receive, from the application via the network function (e.g., network function 1 201), the request for control information or status information. For example, information obtaining component 252 can receive the request for control information and/or status information from the one or more core network nodes, and can obtain the control information and/or status information, as described in Block 402, based on the request. Moreover, in an example, the request can be provided to the mechanism, which can handle the request and determine information to transmit in response to the request. In some examples, the request may be a subscription request to subscribe to receive information of the mechanism based on a periodic interval, occurrence of certain events, etc., and network communicating component 264 can transmit the control information or status information based on the subscription.

In method 400, optionally at Block 408, an identifier associated with the mechanism can be transmitted to the network function. In an aspect, network communicating component 264, e.g., in conjunction with processor(s) 212, memory 216, transceiver 202, communicating component 242, etc., can transmit, to the network function, the identifier associated with the mechanism. As described, the identifier can be a MAC address or other identifier transmitted to the network function 1 201 when the network function 2 204 and/or mechanism establish a connection with the network function 1 201 or other functions of the wireless network. In one example, network communicating component 264 can transmit the identifier to the network function in indicating a capability to receive or transmit control information or status information for the mechanism or the end node. Accordingly, in an example, receiving the request at Block 406 may be based on the identifier and/or capability transmitted at Block 408 (e.g., the network function can transmit the request based on the identifier and/or capability).

In method 400, optionally at Block 410, additional control information can be received, via the one or more core network nodes, from the application. In an aspect, network communicating component 264, e.g., in conjunction with network function 2 204, can receive, via the one or more core network nodes, the additional control information from the application. As described, network function 1 201 can transmit the additional control information to the network function 2 204 based on an identifier associated therewith (e.g., based on a MAC address, other identifier, etc. of the mechanism, as described further herein).

In method 400, optionally at Block 412, the additional control information can be provided to the mechanism. In an aspect, network communicating component 264, e.g., in conjunction with network function 2 204, can provide the additional control information to the mechanism. In this example, the mechanism can store the control information, modify a state based on the control information, and/or the like.

Figure 5:
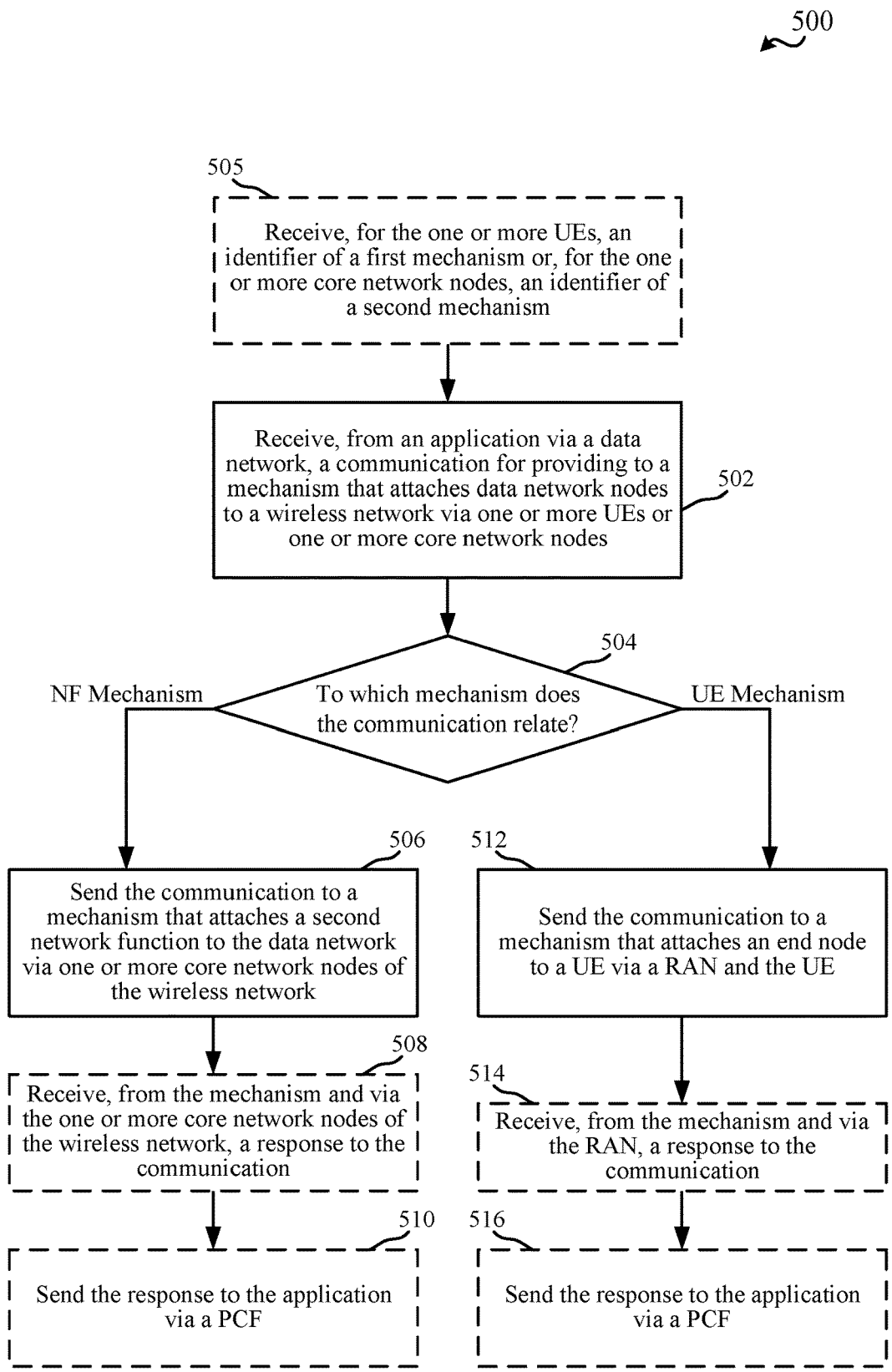
FIG. 5 is a flow chart illustrating an example of a method for communicating control information to various mechanisms that operate in a data network, in accordance with various aspects of the present disclosure.

FIG. 5 illustrates a flow chart of an example of a method 500 for communicating control information for mechanisms that attach data network nodes to a wireless network in accordance with aspects described herein. In one example, a SMF 194 or other network function can perform the functions described in method 500 using one or more of the components described in FIGS. 1 and 2.

In method 500, at Block 502, a communication for providing to a mechanism that attaches data network nodes to a wireless network via one or more UEs or one or more core network nodes can be received from an application via a data network. In an aspect, communication managing component 262, e.g., in conjunction with network function 1 201, can receive, from the application via the data network, the communication for providing to the mechanism that attaches data network nodes to a wireless network via one or more UEs or one or more core network nodes. For example, communication managing component 262 can receive the communication as control information (also referred to as management information), status information, and/or the like for the mechanism, where the mechanism may include an Ethernet port or other interface, as described and/or for an end node connected to a UE via the mechanism, for a network function connected to a network via the mechanism, etc. Depending on the type of mechanism to which the communication relates, communication managing component 262 may send the communication through different nodes.

In method 500, at Block 504, it can be determined to which mechanism does the communication relate. In an aspect, communication managing component 262, e.g., in conjunction with network function 1 201, can determine to which mechanism the communication relates. For example, communication managing component 262 can determine whether the communication relates to a network function (NF) mechanism or a UE mechanism. In one example, communication managing component 262 can determine the mechanism based on information identified in the communication, such as an identifier (e.g., MAC address, other identifier, or other address or identifier). In a specific example, communication managing component 262 can compare the identifier in the communication with known identifiers of various NF mechanisms and UE mechanisms to check for a match, where the UEs and network functions may have previously indicated an associated identifier to network function 1 201, as described above and further herein (e.g., in transmitting control information or status information, in indicating a capability to transmit or receive such information, etc.).

In this regard, for example, optionally at Block 505, an identifier of a first mechanism can be received for the one or more UEs (e.g., that include the mechanism to attach to an end node) and/or an identifier of a second mechanism can be received for the one or more core network nodes. In an aspect, communication managing component 262, e.g., in conjunction with network function 1 201, can receive, for the one or more UEs, an identifier of the first mechanism or, for the one or more core network nodes, an identifier of the second mechanism. For example, communication managing component 262 can receive the identifiers from the nodes when the nodes establish a connection with the network and/or the network function 1 201 (e.g., SMF), indicate a capability to communicate control or status information, etc., as described. In one example, communication managing component 262 can receive the identifiers from another network function (e.g., a UPF) based on the nodes establishing connection with the network.

Where the communication is determined to relate to a NF mechanism, at Block 506, the communication can be sent to a mechanism that attaches a second network function to the data network via one or more core network nodes of the wireless network. In an aspect, communication managing component 262, e.g., in conjunction with network function 1 201, can send the communication to the mechanism that attaches the second network function to the data network where the sending is performed via one or more core network nodes of the wireless network. In this example, communication managing component 262 can send the communication to network function 2 204 for providing to its mechanism that it uses to attach to the data network (e.g., an Ethernet port).

In method 500, optionally at Block 508, a response to the communication can be received from the mechanism and via the one or more core network nodes of the wireless network. In an aspect, communication managing component 262, e.g., in conjunction with network function 1 201, can receive, from the mechanism (e.g., from the mechanism of network function 2 204 and/or from the network function 2 204 itself) and via the one or more core network nodes of the wireless network, the response to the communication. In this example, the original communication may include a request for management information, a request to subscribe to receive management information, etc., and thus the response can include the requested information, in one example.

In method 500, optionally at Block 510, the response can be sent to the application via a PCF. In an aspect, communication managing component 262, e.g., in conjunction with network function 1 201, can send the response to the application via a PCF or other node of the data network that can be deployed between the network function 1 201 and the application, as described further herein.

Where the communication is determined to relate to a UE mechanism, at Block 512, the communication can be sent to a mechanism that attaches an end node to the UE via the RAN and the UE. In an aspect, communication managing component 262, e.g., in conjunction with network function 1 201, can send the communication to the mechanism that attaches the end node to the UE via the RAN and the UE. In this example, communication managing component 262 can send the communication to the UE via the RAN, and as described the UE 104 can send the communication to node communicating component 230, which may include the mechanism (e.g., an Ethernet port).

In method 500, optionally at Block 514, a response to the communication can be received from the mechanism and via the RAN. In an aspect, communication managing component 262, e.g., in conjunction with network function 1 201, can receive, from the mechanism (e.g., from the mechanism of end node communicating component 230 and/or from the end node communicating component 230 itself) and via the RAN, the response to the communication. In this example, the original communication may include a request for management information, a request to subscribe to receive management information, etc., and thus the response can include the requested information, in one example.

In method 500, optionally at Block 516, the response can be sent to the application via a PCF. In an aspect, communication managing component 262, e.g., in conjunction with network function 1 201, can send the response to the application via the PCF.

Figure 6:
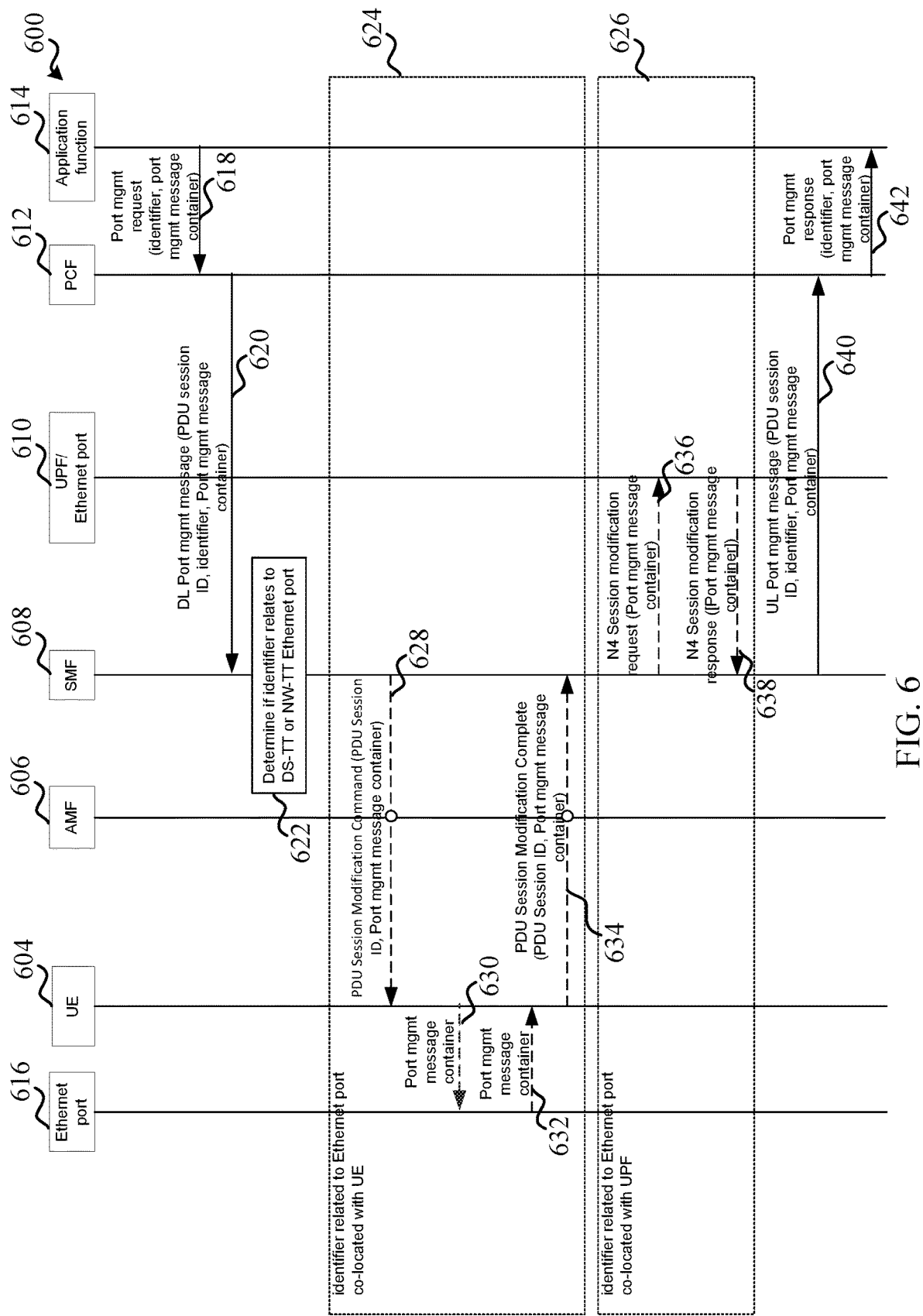
FIG. 6 illustrates an example of a system for initiating port management from an application function, in accordance with various aspects of the present disclosure.

FIG. 6 illustrates a specific example of a system 600 for initiating management information reporting from an application function. System 600 includes a UE 604 that communicates in a wireless network (e.g., via a RAN, not shown) to access AMF 606, SMF 608, UPF 610, policy control function (PCF) 612, application function 614 (which may be similar to or part of application 266 or application 198), etc. In addition, UE 604 can be coupled to an Ethernet port 616 to facilitate providing communications for an end node attached via the Ethernet port 616, as described herein. UPF 610 may also include an Ethernet port for communicating with other end nodes 614. This can allow the end node attached to UE 604 via Ethernet port 616 to communicate with other end nodes 614 via UPF 610 in a data network. To facilitate management of the Ethernet ports, SMF 608 can allow for sending management information from the application function 614 to the Ethernet port 616 and/or Ethernet port of UPF 610, as described herein.

In an example, application function 614 can send a port management request 618 to the PCF 612, where the port management request 618 can specify an identifier (e.g., MAC address, other identifier, etc.) and a port management request container. PCF can forward the port management message 620 to the SMF 608 based on determining the identifier (e.g., MAC address, other identifier, etc.) as being for a node associated with (e.g., registered by or as otherwise being associated with) the SMF 608. PCF 612 can include, in the port management message 620, a PDU session identifier, identifier (e.g., MAC address, other identifier, etc.), and port management message container. SMF 608 can receive the port management message and can determine, at 622, whether the identifier (e.g., MAC address, other identifier, etc.) in the message relates to a device Ethernet port or a network (e.g., UPF) Ethernet port. Where the SMF 608 determines the identifier (e.g., MAC address, other identifier, etc.) relates to a device Ethernet port, process 624 can be performed, and where the SMF 608 determines the identifier (e.g., MAC address, other identifier, etc.) relates to a network Ethernet port, process 626 can be performed.

In process 624, SMF 608 can send a PDU session modification message 628 to the UE 604, where the message 628 can indicate the PDU session identifier and the port management message container. UE 604 can receive the message 628 and can forward the port management message container 630 to the Ethernet port 616 related to the PDU session identifier. Ethernet port 616 can process the message (e.g. using proprietary instructions) and can transmit a port management message container 632 back to UE 604 (e.g., when completed). UE 604 can then transmit a PDU session modification complete message 634 to the SMF 608 to indicate that the port management message container was sent and processed by the Ethernet port 616.

In process 626, SMF 608 can send a N4 session modification request 636 to the UPF 610, where the message 636 can indicate the port management message container. UPF 610 can receive the message 636 and can forward the port management message container to its Ethernet port. UPF 610 can then transmit a N4 session modification response message 638 to the SMF 608 to indicate that the port management message container was sent and processed by its Ethernet port.

In either case, SMF 608 can then transmit an uplink port management message 640 to the PCF 612, where the message 640 can indicate the PDU session identifier, identifier (e.g., MAC address, other identifier, etc.), port management message container, etc. PCF 612 can transmit a port management response message 642 to the application function 614.

Figure 7:
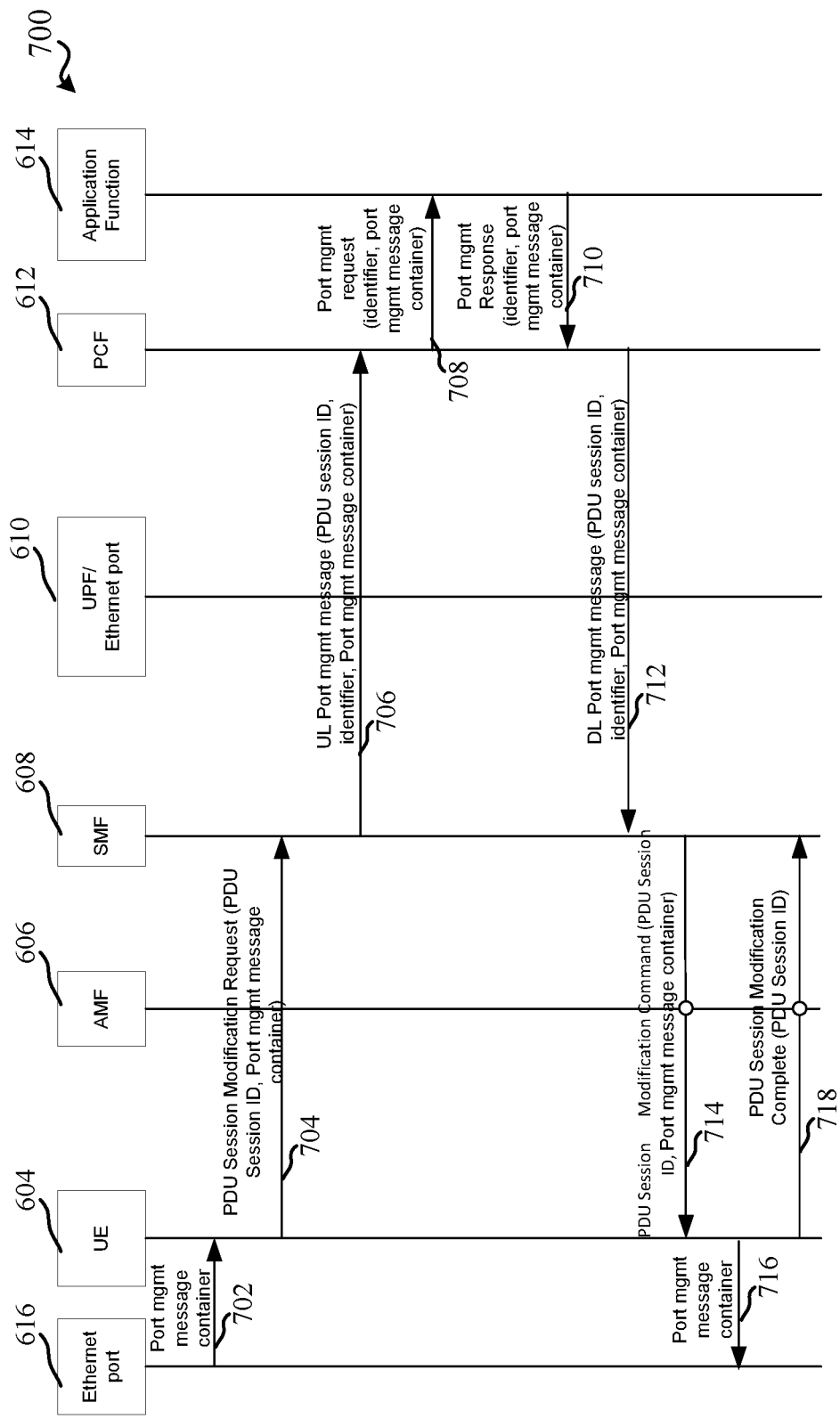
FIG. 7 illustrates an example of a system for initiating port management from an Ethernet port of a user equipment, in accordance with various aspects of the present disclosure.

FIG. 7 illustrates a specific example of a system 700 for initiating management information reporting from a UE. System 600 includes a UE 604 that communicates in a wireless network (e.g., via a RAN, not shown) to access AMF 606, SMF 608, UPF 610, PCF 612, application function 614, etc. In addition, UE 604 can be coupled to an Ethernet port 616 to facilitate providing communications for an end node attached via the Ethernet port 616, as described herein. UPF 610 may also include an Ethernet port for communicating with application function 614. This can allow the end node attached to UE 604 via Ethernet port 616 to communicate with application function 614 via UPF 610 in a data network. To facilitate management of the Ethernet ports, UE 104 can allow for sending management information to the application function 614, as described herein.

In an example, Ethernet port 616 can send a port management message container 702 to the UE 604 for sending to an application function. UE 604 can transmit a PDU session modification request 704 to the SMF 608 and can include a PDU session identifier and a port management message container. SMF 608 can transmit an uplink port management message 706 to the PCF, which can include the PDU session identifier, the identifier (e.g., MAC address, other identifier, etc.) of the Ethernet port 616, and/or the port management message container. The PCF 612 can transmit a port management request 708 to the application function 614, which can include the identifier (e.g., MAC address, other identifier, etc.) and port management message container. Application function 614 can process the port management message based on the identifier (e.g., MAC address, other identifier, etc.), and can generate and transmit a port management response 710 to the PCF 612, which can indicate the identifier (e.g., MAC address, other identifier, etc.) and port management message container. PCF 612 can transmit a downlink port management message 712 to the SMF 608, which can include the PDU session identifier, identifier (e.g., MAC address, other identifier, etc.), and port management message container. SMF 608 can transmit a PDU session modification command 714 to the UE 604, which can include the PDU session identifier, and port management message container. The UE 604 can transmit the port management message container 716 to Ethernet port 616. UE 104 can also transmit a PDU session modification complete message 718 to the SMF 608.

Figure 8:
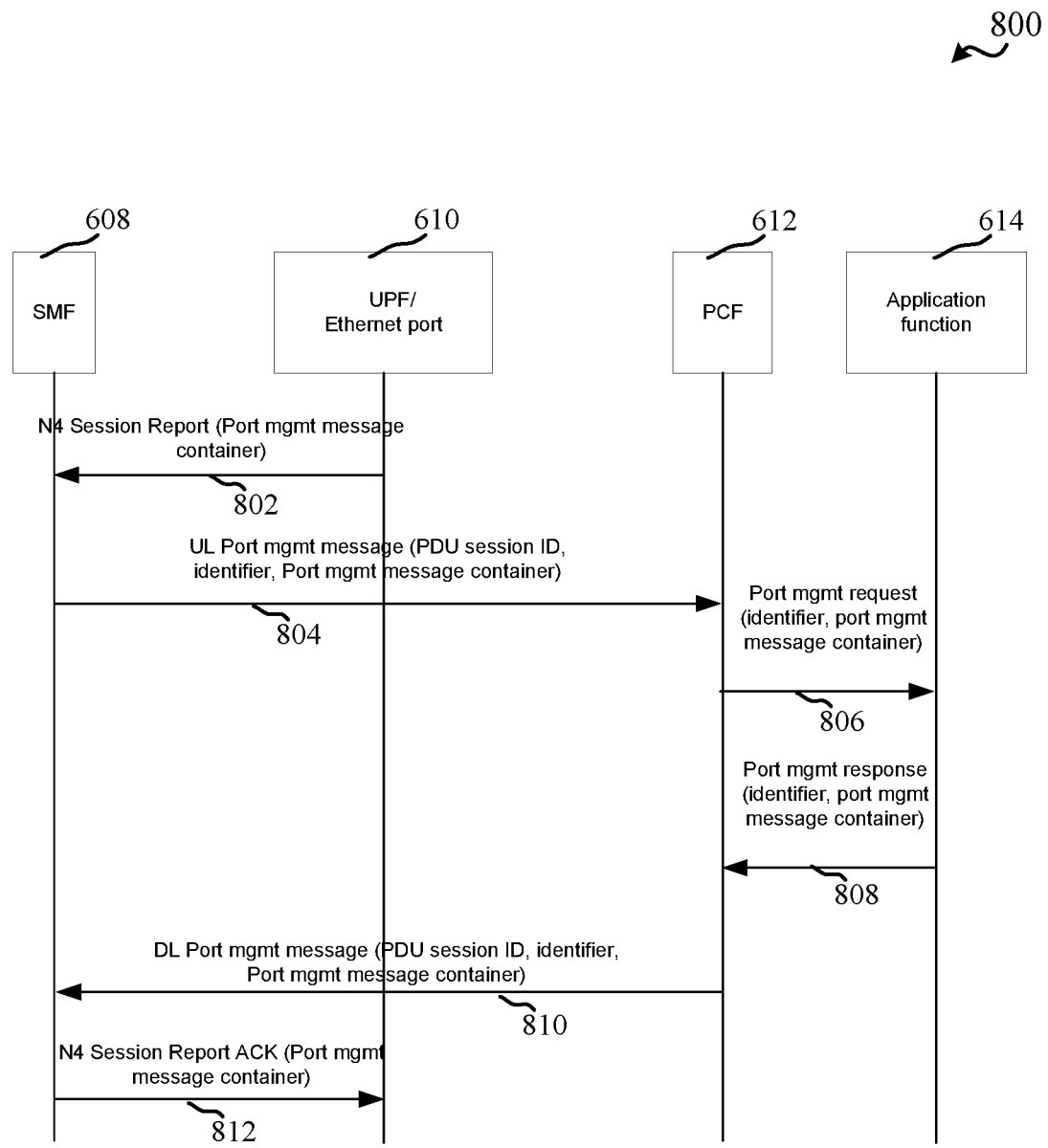
FIG. 8 illustrates an example of a system for initiating port management from a user plane function, in accordance with various aspects of the present disclosure.

FIG. 8 illustrates a specific example of a system 800 for initiating management information reporting from a UPF with an Ethernet port. System 800 includes a SMF 608, UPF 610, PCF 612, application function 614, etc. UPF 610 may include an Ethernet port for communicating with application function 614. This can allow the UPF 610 to communicate with other nodes via a data network, such as an end node attached to a UE. To facilitate management of the Ethernet ports, UPF 610 can allow for sending management information to the application function 614, as described herein.

In an example, UPF 610 can transmit a N4 session report 802 to the SMF 608, which can include a port management message container. SMF 608 can accordingly transmit a uplink port management message 804 to the PCF 612, which can indicate a PDU session identifier, identifier (e.g., MAC address, other identifier, etc.), etc. associated with the Ethernet port of the UPF 610 and the port management message container. PCF 612 can transmit a port management request 806 to the application function 614, which can include the identifier (e.g., MAC address, other identifier, etc.) and port management message container. Application function 614 can process the port management message based on the identifier (e.g., MAC address, other identifier, etc.), and can generate and transmit a port management response 808 to the PCF 612, which can indicate the identifier (e.g., MAC address, other identifier, etc.) and port management message container. PCF 612 can transmit a downlink port management message 810 to the SMF 608, which can include the PDU session identifier, identifier (e.g., MAC address, other identifier, etc.), and port management message container. SMF 608 can transmit a N4 session report acknowledgement 812 to the UPF 610, which can indicate the port management message container. In the above examples, SMF 608 and UPF 610 can communicate as components of a wireless network, though UPF 610 can also communicate with the data network via the same or different Ethernet port.

In one example, a method of wireless communication includes exchanging different types of data transparently via a control-plane path between a network function A (e.g., network function 1 201) and an end node attached to a UE (e.g., UE 104) or between a network function A and another network function C (e.g., network function 2 204). In one example, the exchanging data includes a network function A encapsulating data in a container, forwarding the container and an identifier to another network function B, network function B determining whether the identifier relates to another network function C or the end-node attached to the UE, forwarding the container transparently via the control-plane to the UE if the identifier relates to the end-node attached to the UE, forwarding the container transparently via the control-plane to a network function C if the identifier relates to network function C, the end-node attached to the UE encapsulating data in a container, forwarding the container transparently via the control-plane to the network function A, network function C encapsulating data in a container, forwarding the container transparently via the control-plane to network function B, network function B forwarding the data to network function A, etc., as more specifically described above.

In another example, network function B determining whether the identifier relates to another network function or the end-node attached to the UE can include the end-node attached to the UE reporting an identifier X to the UE, the UE reporting the identifier to a network function B, network function B storing identifier X, network function C reporting an identifier Y to network function B, network function B storing identifier Y, network function B comparing the identifier provided by network function A with X and Y and based on this, forwarding the container to the UE or network function C, etc.

In another example, the end-node attached to the UE is an Ethernet port and the management entity of the Ethernet port, identifier X can be the MAC address, other identifier, etc., of the Ethernet port attached to the UE, network function C is a User-plane function (UPF) and the management entity of the Ethernet ports of the UPF, identifier Y is the MAC address, other identifier, etc. of an Ethernet port of the UPF, Network function A is an Application function, Network function B is the Session Management Function (SMF). In this example, the UE reports the identifier X of the Ethernet port attached to the UE to the SMF during or after PDU Session Establishment, the UPF reports the identifier Y of the Ethernet port of the UPF, which is serving the UE's PDU session, to the SMF during or after PDU Session Establishment. Also, in this example, the UE can indicate support of the aspects described herein (e.g., support of capability to communicating management information) to the SMF. The SMF can report the identifier X of the Ethernet port attached to the UE and the identifier Y of the Ethernet port of the UPF to the PCF. The PCF can report the identifier X of the Ethernet port attached to the UE and the identifier Y of the Ethernet port of the UPF to the Application Function, etc.

In another example, indicating support of the aspects described above (e.g., support of capability to communicating management information) to/from the SMF can include indicating support in the Core Network SM Capabilities or based on an indication sent in the Protocol Configuration Options (PCO). In another example, forwarding a container from application function via the control-plane to an Ethernet port attached to the UE can include Application function passing a container M and the identifier X of the Ethernet port attached to the UE or the identifier Y of the Ethernet port of the UPF to the PCF, PCF passing container M and the identifier X or Y to the SMF, which is serving the PDU session for which the identifier X or Y was reported, SMF determining whether the identifier X or Y relates to a UE or UPF, etc. If the identifier X or identifier Y relates to a UPF, SMF can pass container M to the UPF using the N4 Session modification request, UPF or the management entity of the Ethernet ports of the UPF can encapsulate data (e.g. in response to the received data in container M) in a container N and providing container N to the SMF, SMF can provide container N to PCF, and PCF can provide container N to the application function. If the identifier X or Y relates to a UE, SMF can embed container M into a NAS message A and pass NAS message A and the PDU Session ID of the PDU session for which the identifier X or Y was reported, to the AMF using the Namf_Communication_N1N2MessageTransfer service, AMF can pass PDU session ID and NAS message A to the UE, UE can provide container M to the Ethernet port or the management entity of the Ethernet port attached to the UE, Ethernet port or the management entity of the Ethernet port attached to the UE can encapsulate data (e.g. in response to the received data) in a container N and can provide container N to the UE, UE can encapsulate container N and a PDU Session ID into a NAS Message B and provide container N to the AMF, AMF can pass NAS message B to the SMF, SMF can extract container N and pass container N to PCF, PCF can provide container N to the application function.

In an example, NAS message A is a PDU Session Modification Command message and NAS message B is a PDU Session Modification Complete message. In another example, container M can include an indication whether to read or write Ethernet port management information or whether to subscribe for receiving notifications in case of a change of specific Ethernet port management information from the Ethernet port attached to a UE or the Ethernet port of a UPF, information identifying the Ethernet port management information to read, write or receive notifications for, Ethernet port management information in case of an indication to write Ethernet port management information, etc. In an example, container N includes Ethernet port management information from the Ethernet port attached to a UE or the Ethernet port of a UPF, or an acknowledgement.

In another example, forwarding the container transparently from an Ethernet port attached to the UE via the control-plane to an application function includes the Ethernet port or the management entity of the Ethernet port attached to the UE providing a container M to the UE, UE encapsulating container M and a PDU Session ID into a NAS Message C and providing the NAS message to the AMF, AMF passing NAS message C to the SMF, SMF extracting container M and passing container M to PCF, PCF providing container M to the application function, Application function embedding data into a container N (e.g. in response to the data in container M) and passing container N and the identifier (e.g., MAC address, other identifier, etc.) of the end-node to send data to (Ethernet port attached to the UE) to the PCF, PCF passing container N and the identifier (e.g., MAC address, other identifier, etc.) to the SMF, which is serving the PDU session for which the identifier (e.g., MAC address, other identifier, etc.) was reported, SMF embedding container N into a NAS message D and passing NAS message D and the PDU Session ID of the PDU session for which the identifier (e.g., MAC address, other identifier, etc.) was reported to the AMF using the Namf_Communication_N1N2MessageTransfer service, AMF passing PDU session ID, NAS message D to the UE, UE providing container N to the Ethernet port or the management entity of the Ethernet port attached to the UE, UE sending a NAS message E to AMF, AMF sending NAS message E to SMF, etc.

In another example, NAS message C is a PDU Session Modification Request message, NAS message D is a PDU Session Modification Command and NAS message E is a PDU Session Modification Complete message. In another example, container M includes Ethernet port management information from the Ethernet port attached to a UE. In another example, container N includes an acknowledgement, and/or an indication whether to read, write or receive notifications in case of changes of specific Ethernet port management information of the Ethernet port attached to a UE, Information identifying the Ethernet port management information to read, write or receive notifications for, Ethernet port management information in case of an indication to write Ethernet port management information.

In another example, forwarding the container transparently from a UPF via the control-plane to an application function includes UPF passing a container M to SMF using the N4 Session Report message, SMF passing container M, the PDU Session ID of the related session and the identifier (e.g., MAC address, other identifier, etc.) of the Ethernet port that was reported to SMF to PCF, PCF passing container M and the identifier (e.g., MAC address, other identifier, etc.) to the application function, Application function embedding data into a container N (e.g. in response to the data in the received container) and passing container N and the identifier (e.g., MAC address, other identifier, etc.) of the end-node to send data to (Ethernet port of the UPF) to the PCF, PCF passing container N and the identifier (e.g., MAC address, other identifier, etc.) of the end-node to send data to the SMF, which is serving the PDU session for which the identifier (e.g., MAC address, other identifier, etc.), SMF passing container N to the UPF using the N4 Session Report ACK message. In an example, container M includes Ethernet port management information of the Ethernet port of a UPF. In an example, container N includes an acknowledgement, and/or an indication whether to read, write or receive notifications in case of changes of specific Ethernet port management information of the Ethernet port of the UPF, Information identifying the Ethernet port management information to read, write or receive notifications for, Ethernet port management information in case of an indication to write Ethernet port management information, etc.

In an example, Ethernet port management information includes information such as dependentDelayMax, dependentDelayMin, Tx propagation delay, Tick granularity, Traffic Class table and other management objects as defined in IEEE 802.1qcc, information AdminBaseTime, AdminControlList, AdminCycleTime and AdminControlListLength and other management objects as defined in IEEE 802.1Q, information as defined in IEEE 802.1AB to control the neighbor discovery behavior of Ethernet ports and to retrieve information about discovered neighbors, etc.

Figure 9:
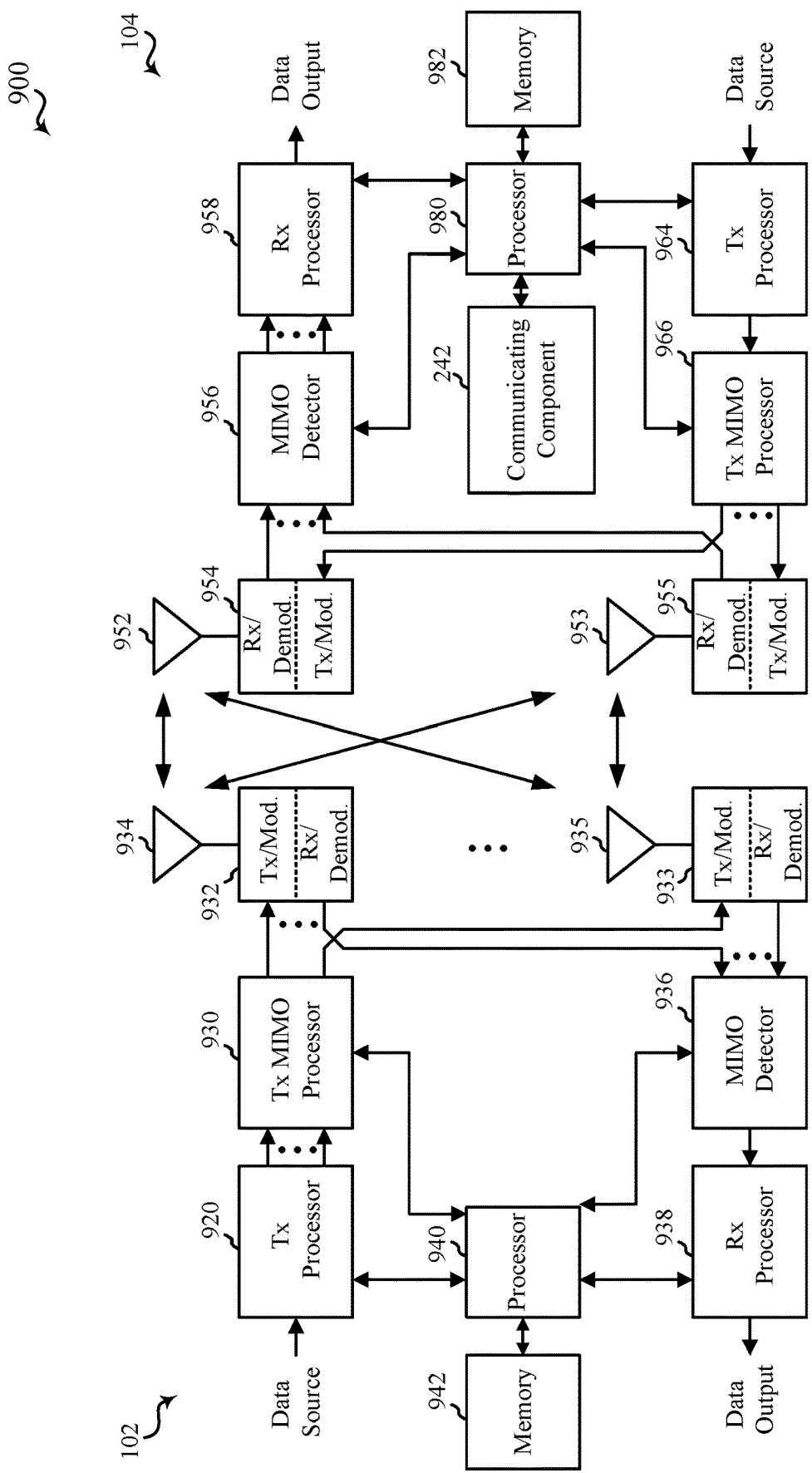
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2). For example, communicating component 242 can transmit control information or status information, as described, to another UE 104 and/or corresponding communicating component 242 via a RAN. This may include communicating component 242 transmitting the control information or status information to the base station 102 using the antennas 952 and 953, modulator/demodulators 954 and 955, etc. The base station can receive the control information or status information and can transmit or forward the information to another UE 104, a component of a wireless network, etc. using antennas 934 and 935, modulator/demodulators 932 and 933, etc.

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

SOME FURTHER EXAMPLES

In one example, a method for reporting control information via wireless communication is provided. The method includes obtaining, by a user equipment (UE), at least one of control information or status information for at least one of a mechanism used to attach an end node to the UE or the end node, and transmitting, via a radio access network, at least one of the control information or the status information to a network function in a wireless network for providing to an application that manages at least one of the mechanism or the end node.

One or more of the above examples can further include transmitting, to the network function, an indication of a media access control (MAC) address associated with the mechanism.

One or more of the above examples can further include wherein the mechanism includes an Ethernet port, and wherein at least one of the control information or the status information relates to management information for the Ethernet port.

One or more of the above examples can further include wherein a container used to transmit at least one of the control information or the status information includes or is transmitted along with a media access control (MAC) address associated with the Ethernet port.

One or more of the above examples can further include wherein the network function corresponds to a session management function (SMF) or an access and mobility management function (AMF) or a Policy Control Function (PCF) of a fifth generation (5G) network core.

One or more of the above examples can further include receiving, from the application via the network function, a request for at least one of the control information or the status information, wherein obtaining at least one of the control information or the status information is based at least in part on receiving the request.

One or more of the above examples can further include forwarding the request to the mechanism, wherein the mechanism includes an Ethernet port or a management entity for the Ethernet port.

One or more of the above examples can further include receiving, from the application via the network function, separate control information for the mechanism, and providing the separate control information to the mechanism.

One or more of the above examples can further include wherein transmitting at least one of the control information or the status information is based at least in part on determining, via Core Network SM Capabilities or an indication sent in a Protocol Configuration Options (PCO) message received from the application, that transmitting at least one of the control information or the status information is supported.

One or more of the above examples can further include wherein transmitting at least one of the control information or the status information includes initiating a request to provide at least one of the control information or the status information to, or receive other control information or status information from, the application.

In another example, a method for reporting control information via wireless communication is provided. The method includes obtaining, by a first network function, at least one of control information or status information for a mechanism on the first network function used to communicate with an end node attached to the UE; and transmitting, via one or more core network nodes of a wireless network, at least one of the control information or the status information to a second network function for providing to an application that manages the mechanism.

One or more of the above examples can further include transmitting, to the first network function, an indication of a media access control (MAC) address associated with the mechanism.

One or more of the above examples can further include wherein the mechanism includes an Ethernet port, and wherein at least one of the control information or the status information relates to management information for the Ethernet port.

One or more of the above examples can further include wherein a container used to transmit at least one of the control information or the status information includes or is transmitted along with a media access control (MAC) address associated with the Ethernet port.

One or more of the above examples can further include wherein the second network function corresponds to a session management function (SMF) of a fifth generation (5G) network core.

One or more of the above examples can further include receiving, from the application via the second network function, a request for at least one of the control information or the status information, wherein obtaining at least one of the control information or the status information is based at least in part on receiving the request.

One or more of the above examples can further include wherein transmitting at least one of the control information or the status information includes initiating a request to provide at least one of the control information or the status information to, or receive other control information or status information from, the application.

In another example, a method for reporting control information via wireless communication is provided. The method includes receiving, by a first network function and from an application via a data network, a communication for providing to a mechanism that attaches data network nodes to a wireless network via one or more UEs or one or more core network nodes, determining a mechanism to which the communication relates, where the communication relates to at least one of a first mechanism used to attach an end node to a user equipment (UE) or the end node, transmitting the communication to the first mechanism via a radio access network and the UE, and where the communication relates to a second mechanism used to attach a second network function to the data network, sending the communication to the second mechanism via one or more core network nodes of the wireless network.

One or more of the above examples can further include receiving, from the UE, a first media access control (MAC) address associated with the first mechanism, and receiving, from the second network function, a second MAC address associated with the second mechanism.

One or more of the above examples can further include wherein at least one of the first mechanism and the second mechanism include an Ethernet port, and wherein the communication includes management information for the Ethernet port.

One or more of the above examples can further include wherein determining the mechanism comprises comparing a media access control (MAC) address received in or with the communication to known MAC addresses of mechanisms in the wireless network.

One or more of the above examples can further include receiving, from the first mechanism and via the radio access network, a response to the communication, and sending the response to the application via a policy control function (PCF).

One or more of the above examples can further include receiving, from the second mechanism and via the one or more core network nodes of the wireless network, a response to the communication, and sending the response to the application via the data network.

An example apparatus includes a transceiver, a memory configured to store instructions, and one or more processors communicatively coupled with the transceiver and the memory, wherein the one or more processors are configured to perform all or part of one or more of the above example methods.

An example apparatus includes means for performing all or part of one or more of the above example methods.

A computer-readable medium includes code executable by one or more processors for wireless communications, the code including code for performing all or part of one or more of the above example methods.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for reporting control information via wireless communication, comprising:
    obtaining, by a user equipment (UE), at least one of control information or status information for at least one of a mechanism used to attach an end node to the UE or the end node, wherein the mechanism includes an Ethernet port or a management entity for the Ethernet port, and wherein at least one of the control information or the status information relates to management information for the Ethernet port; and
    transmitting, via a radio access network, at least one of the control information or the status information to a network function in a wireless network for providing to an application that manages at least one of the mechanism or the end node.

2. The method of claim 1, wherein the network function corresponds to a session management function (SMF) or an access and mobility management function (AMF) or a Policy Control Function (PCF) of a fifth generation (5G) network core.

3. The method of claim 1, further comprising receiving, from the application via the network function, a request for at least one of the control information or the status information, wherein obtaining at least one of the control information or the status information is based at least in part on receiving the request.

4. The method of claim 3, further comprising forwarding the request to the mechanism.

5. The method of claim 1, further comprising:
    receiving, from the application via the network function, separate control information for the mechanism; and
    providing the separate control information to the mechanism.

6. The method of claim 5, wherein receiving, from the application, a request for at least one of the control information or the status information is based at least in part on transmitting, by the UE, Core Network SM Capabilities or a Protocol Configuration Options (PCO) message indicating receiving at least one of the control information or sending the status information is supported at least by the UE.

7. A method for reporting control information via wireless communication, comprising:
    obtaining, by a first network function, at least one of control information or status information for a mechanism on the first network function used to communicate with an end node, wherein the mechanism includes an Ethernet port or a management entity for the Ethernet port, and wherein at least one of the control information or the status information relates to management information for the Ethernet port; and
    transmitting, via one or more core network nodes of a wireless network, at least one of the control information or the status information to a second network function for providing to an application that manages the mechanism.

8. The method of claim 7, further comprising transmitting, to the first network function, an identifier associated with the mechanism.

9. The method of claim 7, wherein the second network function corresponds to a session management function (SMF) of a fifth generation (5G) network core.

10. The method of claim 7, further comprising receiving, from the application via the second network function, a request for at least one of the control information or the status information, wherein obtaining at least one of the control information or the status information is based at least in part on receiving the request.

11. The method of claim 7, wherein transmitting at least one of the control information or the status information includes initiating a request to provide at least one of the control information or the status information to, or receive other control information or status information from, the application.

12. A method for reporting control information via wireless communication, comprising:
    receiving, by a first network function and from an application via a data network, a communication for providing to a mechanism that attaches data network nodes to a wireless network via one or more UEs or one or more core network nodes;
    where the communication relates to at least one of a first mechanism used to attach an end node to a user equipment (UE) or the end node, transmitting the communication to the first mechanism via a radio access network and the UE, wherein the first mechanism includes a first Ethernet port or a management entity for the first Ethernet port, and wherein the communication relates to management information for the first Ethernet port; and
    where the communication relates to a second mechanism used to attach a second network function to the data network, sending the communication to the second mechanism via one or more core network nodes of the wireless network, wherein the second mechanism includes a second Ethernet port or a management entity for the second Ethernet port, and wherein the communication relates to management information for the second Ethernet port.

13. The method of claim 12, further comprising:
    receiving, from the second network function, a first identifier associated with the first mechanism; and
    receiving, from the second network function, a second identifier associated with the second mechanism.

14. The method of claim 12, further comprising comparing an identifier received in or with the communication to known identifiers of mechanisms in the wireless network.

15. The method of claim 12, further comprising:
    receiving, from the first mechanism and via the radio access network, a response to the communication; and
    sending the response to the application via a policy control function (PCF).

16. The method of claim 12, further comprising:
    receiving, from the second mechanism and via the one or more core network nodes of the wireless network, a response to the communication; and
    sending the response to the application via the data network.

17. An apparatus for wireless communication, comprising:
a transceiver;
a memory configured to store instructions; and
one or more processors coupled with the transceiver and the memory, wherein the one or more processors are configured to:
obtain at least one of control information or status information for at least one of a mechanism used to attach an end node to the apparatus or the end node, wherein the mechanism includes an Ethernet port or a management entity for the Ethernet port, and wherein at least one of the control information or the status information relates to management information for the Ethernet port; and
transmit, via a radio access network, at least one of the control information or the status information to a network function in a wireless network for providing to an application that manages at least one of the mechanism or the end node.

18. The apparatus of claim 17, wherein the network function corresponds to a session management function (SMF) or an access and mobility management function (AMF) or a Policy Control Function (PCF) of a fifth generation (5G) network core.

19. The apparatus of claim 17, wherein the one or more processors are further configured to receive, from the application via the network function, a request for at least one of the control information or the status information, wherein the one or more processors are configured to obtain at least one of the control information or the status information based at least in part on receiving the request.

20. The apparatus of claim 19, wherein the one or more processors are further configured to forward the request to the mechanism.

21. The apparatus of claim 17, wherein the one or more processors are further configured to:
receive, from the application via the network function, separate control information for the mechanism; and
provide the separate control information to the mechanism.

22. The apparatus of claim 21, wherein the one or more processors are further configured to receive, from the application, a request for at least one of the control information or the status information is based at least in part on transmitting Core Network SM Capabilities or a Protocol Configuration Options (PCO) message indicating receiving at least one of the control information or sending the status information is supported at least by the apparatus.

23. An apparatus for wireless communication, comprising:
a transceiver;
a memory configured to store instructions; and
one or more processors coupled with the transceiver and the memory, wherein the one or more processors are configured to:
obtain, by a first network function, at least one of control information or status information for a mechanism on the first network function used to communicate with an end node, wherein the mechanism includes an Ethernet port or a management entity for the Ethernet port, and wherein at least one of the control information or the status information relates to management information for the Ethernet port; and
transmit, via one or more core network nodes of a wireless network, at least one of the control information or the status information to a second network function for providing to an application that manages the mechanism.

24. The apparatus of claim 23, wherein the one or more processors are further configured to transmit, to the first network function, an identifier associated with the mechanism.

25. The apparatus of claim 23, wherein the second network function corresponds to a session management function (SMF) of a fifth generation (5G) network core.

26. The apparatus of claim 23, wherein the one or more processors are further configured to receive, from the application via the second network function, a request for at least one of the control information or the status information, wherein the one or more processors are configured to obtain at least one of the control information or the status information based at least in part on receiving the request.

27. The apparatus of claim 23, wherein the one or more processors are configured to transmit at least one of the control information or the status information at least in part by initiating a request to provide at least one of the control information or the status information to, or receive other control information or status information from, the application.

28. An apparatus for wireless communication, comprising:
a transceiver;
a memory configured to store instructions; and
one or more processors coupled with the transceiver and the memory, wherein the one or more processors are configured to:
receive, by a first network function and from an application via a data network, a communication for providing to a mechanism that attaches data network nodes to a wireless network via one or more UEs or one or more core network nodes;
where the communication relates to at least one of a first mechanism used to attach an end node to a user equipment (UE) or the end node, transmit the communication to the first mechanism via a radio access network and the UE, wherein the first mechanism includes a first Ethernet port or a management entity for the first Ethernet port, and wherein the communication relates to management information for the first Ethernet port; and
where the communication relates to a second mechanism used to attach a second network function to the data network, send the communication to the second mechanism via one or more core network nodes of the wireless network, wherein the second mechanism includes a second Ethernet port or a management entity for the second Ethernet port, and wherein the communication relates to management information for the second Ethernet port.

29. The apparatus of claim 28, wherein the one or more processors are further configured to:
receive, from the second network function, a first identifier associated with the first mechanism; and
receive, from the second network function, a second identifier associated with the second mechanism.

30. The apparatus of claim 28, wherein the one or more processors are further configured to compare an identifier received in or with the communication to known identifiers of mechanisms in the wireless network.

31. The apparatus of claim 28, wherein the one or more processors are further configured to:

receive, from the first mechanism and via the radio access network, a response to the communication; and send the response to the application via a policy control function (PCF).

32. The apparatus of claim 28, wherein the one or more processors are further configured to:

receive, from the second mechanism and via the one or more core network nodes of the wireless network, a response to the communication; and send the response to the application via the data network.

33. A non-transitory computer-readable medium, comprising code executable by one or more processors for reporting control information via wireless communications, the code comprising code for:

obtaining, by a user equipment (UE), at least one of control information or status information for at least one of a mechanism used to attach an end node to the UE or the end node wherein the mechanism includes an Ethernet port or a management entity for the Ethernet port, and wherein at least one of the control information or the status information relates to management information for the Ethernet port; and transmitting, via a radio access network, at least one of the control information or the status information to a network function in a wireless network for providing to an application that manages at least one of the mechanism or the end node.

34. The non-transitory computer-readable medium of claim 33, wherein the network function corresponds to a session management function (SMF) or an access and mobility management function (AMF) or a Policy Control Function (PCF) of a fifth generation (5G) network core.

35. The non-transitory computer-readable medium of claim 33, further comprising:

code for receiving, from the application via the network function, a request for at least one of the control information or the status information, wherein the code for obtaining obtains at least one of the control information or the status information is based at least in part on receiving the request.

36. The non-transitory computer-readable medium of claim 35, further comprising code for forwarding the request to the mechanism.

37. The non-transitory computer-readable medium of claim 33, further comprising:

code for receiving, from the application via the network function, separate control information for the mechanism; and code for providing the separate control information to the mechanism.

38. The non-transitory computer-readable medium of claim 37, wherein the code for receiving receives, from the application, a request for at least one of the control information or the status information based at least in part on transmitting, by the UE, Core Network SM Capabilities or a Protocol Configuration Options (PCO) message indicating receiving at least one of the control information or sending the status information is supported at least by the UE.

39. A non-transitory computer-readable medium, comprising code executable by one or more processors for reporting control information via wireless communications, the code comprising code for:

obtaining, by a first network function, at least one of control information or status information for a mechanism on the first network function used to communicate with an end node, wherein the mechanism includes an Ethernet port or a management entity for the Ethernet port, and wherein at least one of the control information or the status information relates to management information for the Ethernet port; and transmitting, via one or more core network nodes of a wireless network, at least one of the control information or the status information to a second network function for providing to an application that manages the mechanism.

40. The non-transitory computer-readable medium of claim 39, further comprising code for transmitting, to the first network function, an identifier associated with the mechanism.

41. The non-transitory computer-readable medium of claim 39, wherein the second network function corresponds to a session management function (SMF) of a fifth generation (5G) network core.

42. The non-transitory computer-readable medium of claim 39, further comprising code for receiving, from the application via the second network function, a request for at least one of the control information or the status information, wherein the code for obtaining obtains at least one of the control information or the status information based at least in part on receiving the request.

43. The non-transitory computer-readable medium of claim 39, wherein the code for transmitting transmits at least one of the control information or the status information at least in part by initiating a request to provide at least one of the control information or the status information to, or receive other control information or status information from, the application.

44. A non-transitory computer-readable medium, comprising code executable by one or more processors for reporting control information via wireless communications, the code comprising code for:

receiving, by a first network function and from an application via a data network, a communication for providing to a mechanism that attaches data network nodes to a wireless network via one or more UEs or one or more core network nodes;

where the communication relates to at least one of a first mechanism used to attach an end node to a user equipment (UE) or the end node, transmitting the communication to the first mechanism via a radio access network and the UE, wherein the first mechanism includes a first Ethernet port or a management entity for the first Ethernet port, and wherein the communication relates to management information for the first Ethernet port; and where the communication relates to a second mechanism used to attach a second network function to the data network, sending the communication to the second mechanism via one or more core network nodes of the wireless network, wherein the second mechanism includes a second Ethernet port or a management entity for the second Ethernet port, and wherein the communication relates to management information for the second Ethernet port.

45. The non-transitory computer-readable medium of claim 44, further comprising:

code for receiving, from the second network function, a first identifier associated with the first mechanism; and code for receiving, from the second network function, a second identifier associated with the second mechanism.

46. The non-transitory computer-readable medium of claim 44, further comprising code for comparing an identifier received in or with the communication to known identifiers of mechanisms in the wireless network.

47. The non-transitory computer-readable medium of claim 44, further comprising:
   code for receiving, from the first mechanism and via the radio access network, a response to the communication; and
   code for sending the response to the application via a policy control function (PCF).

48. The non-transitory computer-readable medium of claim 44, further comprising:
   code for receiving, from the second mechanism and via the one or more core network nodes of the wireless network, a response to the communication; and
   code for sending the response to the application via the data network.

* * * * *